F. T. FORSTER.
LIGHTNING ARRESTER.
APPLICATION FILED FEB. 10, 1909.

973,645.

Patented Oct. 25, 1910.

Witnesses:
George H. Tilden
J. Ellis Glen

Inventor:
Frank T. Forster,
by Albert H. Davis
Att'y.

UNITED STATES PATENT OFFICE.

FRANK T. FORSTER, OF SCHENECTADY, NEW YORK, ASSIGNOR TO GENERAL ELECTRIC COMPANY, A CORPORATION OF NEW YORK.

LIGHTNING-ARRESTER.

973,645.  Specification of Letters Patent.  Patented Oct. 25, 1910.

Application filed February 10, 1909. Serial No. 477,187.

*To all whom it may concern:*

Be it known that I, FRANK T. FORSTER, a citizen of the United States, residing at Schenectady, county of Schenectady, State of New York, have invented certain new and useful Improvements in Lightning-Arresters, of which the following is a specification.

My invention relates to aluminum electrolytic lightning arresters, and it embodies certain structural improvements in a low-voltage form of arrester cell.

The electrolytic form of lightning arrester is well known in the art and, therefore, a detailed description of the same is not necessary. It consists, briefly, of aluminum electrode plates immersed in a suitable electrolyte. When a cell of this kind is included in an electric circuit the first rush of current through the same establishes an insulating film upon the anode, which chokes back the current unless the voltage impressed upon the cell exceeds a critical breakdown voltage. Of course, if the cell is included in an alternating-current circuit the insulating film is formed upon both electrodes. I have found that if the electrodes are in contact with any solid body, as an insulator, within the electrolyte the film is weakened at the point of contact with the solid body, and when a current is sent through the cell its efficiency is not only impaired, but the plates deteriorate rapidly at the points of contact, thus decreasing the life of the cell. It has also been found that if the aluminum plates are made of two or more parts, and the point of union, either a mechanical joint or a welded joint, forms a vulnerable spot in the electrode, which is more rapidly attacked by the electrolyte, possibly because of slight variations in the purity of the aluminum of each part, or because of mechanical strains in the metal.

According to my invention all contact of the plates with insulators or spacers within the electrolyte is avoided. The plates are suspended from the cover, which consists of a suitable insulating material, and they are rigidly fixed so as to remain out of contact with one another without the use of spacers within the body of the electrolyte. The electrode plate is made from a single piece of metal, which is suspended in such a manner that the electrolyte is excluded entirely from its joint with the supporting lug.

The novel features of my invention are pointed out with particularity in the appended claims.

Figure 1:
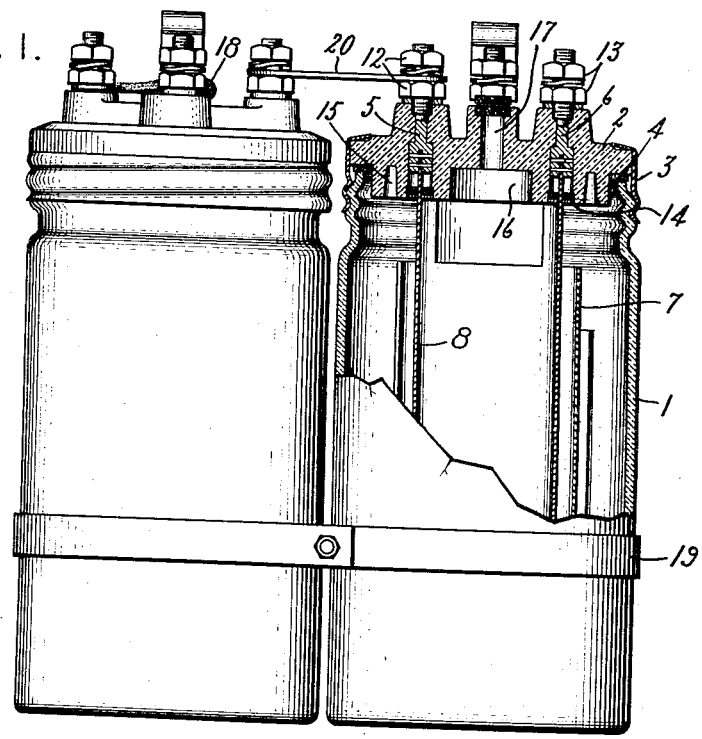
Figure 2:
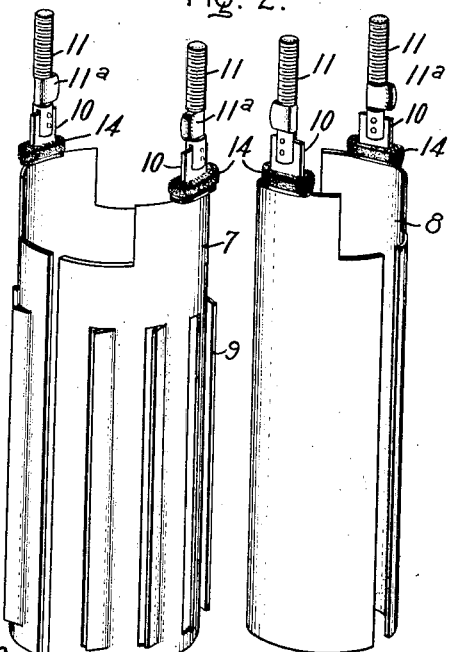
Figure 3:
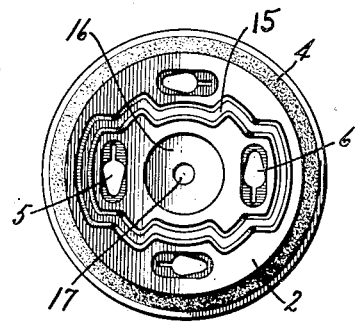

In the accompanying drawings, Figure 1 is a perspective view, partly in section, of two cells strapped together and operative in series; Fig. 2 is a perspective view of a form of concentric electrodes used in a cell, and Fig. 3 is a bottom view of the insulating cover for this cell.

Each cell comprises a glass jar 1 with a porcelain cover 2 fastened thereon by a screw-threaded cap 3. A felt washer 4 may be used to support the cap from the top of the jar. The cover is provided with bosses, each of which is perforated by slots which are larger at the bottom than at the top, or are countersunk, as best shown in Fig. 1, in which two of the slots 5 and 6 are shown. From the cover are suspended two concentric electrodes 7, 8, which are shown in detail in Fig. 2. The electrode 7 has a number of outwardly extending flaps 9 through which the electrolyte may circulate. Each electrode has upwardly extending ears 10 punched from the same piece of metal as the electrode. To these ears are riveted screw threaded lugs 11, having projecting studs 11$^a$, which pass with the projecting ears through the slots in the porcelain cover, as clearly shown in Fig. 1. When assembled the electrodes are firmly drawn up against the cover by the tightening of the nuts 12, 13, the lugs 11 fitting into the slots and in combination with the ears 10 forming projections which serve to suspend the electrodes, and at the same time offer ready means for making contact to the electrodes. The studs 11$^a$ prevent twisting and shearing of the ears 10, when the nuts are tightened. The washers 14, which may consist of felt or other suitable substances, and which surround the lower part of the ears 10, serve to completely exclude the electrolyte from the joint of the lugs 11 with the ears 10. The porcelain cover is provided with a recess 15 between the points of support of the electrodes, 7, 8, as clearly shown in Figs. 1 and 3. The central portion of the cover is provided with a circular recess 16. These recesses increase the amount of surface between the electrodes, and in that manner prevent short circuiting across the film of moisture which may accumulate on the cover.

The cover is provided with an opening 17, which is closed by a piece of felt 18, permitting the escape of gases evolved within the cell.

The cell is provided with a suitable electrolyte, as a solution of ammonium tetraborate.

In the form of arrester here illustrated two cells are ordinarily operated in series, each cell being constructed exactly alike, and the two being rigidly held together by means of a metal band 19 and connecting strip 20.

What I claim as new and desire to secure by Letters Patent of the United States, is:

1. An electrolytic cell comprising a vessel containing an electrolyte, a cover having an opening therethrough, an electrode having an integral ear for extending into said opening, a lug secured to said ear by a joint which is in said opening when said electrode is in place, and a stopper for the lower end of said opening coöperating with said ear to protect the joint between said ear and said lug.

2. An electrolytic cell comprising a vessel containing an electrolyte, a cover having a slot, an electrode having an integral ear extending into said slot, a lug secured inside said slot to said ear and projecting outside said cover, means for clamping said lug to said cover, and a washer on said ear with its edges in engagement with said cover to protect the joint between said ear and said lug.

3. An electrolytic cell comprising a vessel containing an electrolyte, a cover for said vessel having a slot with its lower portion enlarged, an electrode having an integral ear to extend into the enlarged portion of said slot, a lug secured to said ear to extend above the cover, means for securing said lug to said cover, and a washer mounted on said ear with its edges in engagement with the walls of the enlarged portion of said slot to protect the joint between said ear and said lug.

4. An electrolytic cell comprising a vessel containing an electrolyte, a cover for said vessel having therein a slot with its lower portion enlarged, an electrode having an ear to extend into the enlarged portion of said slot, a lug secured to said ear to extend through said slot, means for clamping said lug to said cover, and a stopper mounted on said ear to close the lower end of said slot and thereby protect the joint between said ear and said lug.

5. An electrolytic cell comprising a vessel containing an electrolyte, an insulating cover for said vessel provided with two sets of slots, two concentric electrodes immersed in the electrolyte and each having a set of projections arranged to extend through a corresponding set of slots, clamping means coöperating with said projections to clamp them to the cover, and a groove extending along the inner face of said cover between the two sets of slots.

6. An electrolytic cell comprising a vessel containing an electrolyte, an insulating cover for said vessel having four slots enlarged at the lower ends and arranged in two sets at right angles to each other, two concentric electrodes each having projections at diametrically opposite points to extend through one set of slots, clamping means for holding said projections in firm engagement with said cover, fibrous washers on said projections for stoppering the enlarged ends of said slots, and an endless groove in the inner face of said cover extending between the two sets of slots.

In witness whereof, I have hereunto set my hand this 9th day of February, 1909.

FRANK T. FORSTER.

Witnesses:
HELEN ORFORD,
MARGARET E. WOOLLEY.